United States Patent
Das et al.

(10) Patent No.: US 9,042,646 B2
(45) Date of Patent: *May 26, 2015

(54) DETECTING RECURRING THEMES IN CONSUMER IMAGE COLLECTIONS

(71) Applicant: Intellectual Ventures Fund 83 LLC, Las Vegas, NV (US)

(72) Inventors: Madirakshi Das, Penfield, NY (US); Alexander C. Loui, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,886

(22) Filed: Jan. 3, 2014

(65) Prior Publication Data

US 2014/0119652 A1    May 1, 2014

Related U.S. Application Data

(63) Continuation of application No. 13/221,078, filed on Aug. 30, 2011, now Pat. No. 8,625,904.

(51) Int. Cl.
 G06K 9/00 (2006.01)
 G06K 9/62 (2006.01)
 G06F 17/30 (2006.01)

(52) U.S. Cl.
 CPC ........ G06K 9/6212 (2013.01); G06F 17/30056 (2013.01); G06F 17/30265 (2013.01)

(58) Field of Classification Search
 None
 See application file for complete search history.

(56) References Cited

U.S. PATENT DOCUMENTS

| | | | |
|---|---|---|---|
| 5,781,650 A | 7/1998 | Lobo et al. |
| 6,351,556 B1 | 2/2002 | Loui et al. |
| 6,480,840 B2 | 11/2002 | Zhu et al. |
| 6,504,951 B1 | 1/2003 | Luo et al. |
| 6,598,054 B2 | 7/2003 | Schuetze et al. |
| 6,606,411 B1 | 8/2003 | Loui et al. |
| 7,362,919 B2 | 4/2008 | Das et al. |
| 7,499,590 B2 | 3/2009 | Seeber |
| 2005/0105776 A1 | 5/2005 | Luo et al. |
| 2008/0215984 A1 | 9/2008 | Manico et al. |

(Continued)

OTHER PUBLICATIONS

International Preliminary Report on Patentability for PCT/US2012/051541, mailed Mar. 13, 2014.

(Continued)

*Primary Examiner* — Bhavesh Mehta
*Assistant Examiner* — Siamak Harandi

(57) ABSTRACT

A method of identifying groups of related digital images in a digital image collection, comprising: analyzing each of the digital images to generate associated feature descriptors related to image content or image capture conditions; storing the feature descriptors associated with the digital images in a metadata database; automatically analyzing the metadata database to identify a plurality of frequent itemsets, wherein each of the frequent itemsets is a co-occurring feature descriptor group that occurs in at least a predefined fraction of the digital images; determining a probability of occurrence for each the identified frequent itemsets; determining a quality score for each of the identified frequent itemsets responsive to the determined probability of occurrence; ranking the frequent itemsets based at least on the determined quality scores; and identifying one or more groups of related digital images corresponding to one or more of the top ranked frequent itemsets.

20 Claims, 6 Drawing Sheets

(56) References Cited

U.S. PATENT DOCUMENTS

2008/0275861 A1 11/2008 Baluja et al.
2011/0072047 A1 3/2011 Wang et al.

OTHER PUBLICATIONS

Borgelt, "Efficient Implementations of Apriori and Eclat," Proc. of IEEE ICDM Workshop on Frequent Itemset Mining Implementations (2003).
Boutell et al. "Learning multi-label scene classification," Pattern Recognition, vol. 37, pp. 1757-1771 (2004).
Boutell et al., "Review of the state of the art in semantic scene classification," Computer Science TR 799, University of Rochester (2002).
Carneiro et al., "Supervised learning of semantic classes for image annotation and retrieval," IEEE Transactions on Pattern Analysis and Machine Intelligence, vol. 29, pp. 394-410 (2007).
Das et al, "Indexing flower patent images using domain knowledge," IEEE Intelligent Systems and their Applications, vol. 14, pp. 24-33 (1999).
Final Office Action on U.S. Appl. No. 13/221078, mailed May 21, 2013.
Han et al., Data Mining Concepts and Techniques, Morgan Kaufmann Publishers, Boston, pp. 14-15 (2006).
International Search Report and Written Opinion for PCT/US2012/051541, mailed Dec. 17, 2012.
Jones et al., "Fast Multi-view Face Detection," Mitsubishi Electric Research Laboratories, TR2003-96 (2003).
Junsong Yuan et al: "From frequent itemsets to semantically meaningful visual patterns", Proceedings of the 13.sup.th ACM SIGKDD International Conference of Knowledge Discovery and Data Mining, KDD '07, Jan. 1, 2007, pp. 864,873.
Non-Final Office Action on U.S. Appl. No. 13/221,078, mailed Feb. 5, 2013.
Notice of Allowance on U.S. Appl. 13/221,078, mailed Sep. 9, 2013.
Stephan Gammeter et al., "I know what you did last summer: object-level auto-annotation of holiday snaps", 2009 IEEE 12th International Conference on Computer Vision, Sep. 29, 2009, pp. 614-621.
Xu Chen; Madirakshi Das; and Alexander Loui, "A Novel Framework for Fast Scene Matching in Consumer Image Collections", Jul. 19-23, 2010, ICME Conference 2010, pp. 1034-1039.

DETECTING RECURRING THEMES IN CONSUMER IMAGE COLLECTIONS

CROSS-REFERENCE TO RELATED PATENT APPLICATIONS

This application is a Continuation of U.S. application Ser. No. 13/221,078, filed Aug. 30, 2011, incorporated herein by reference in its entirety.

FIELD

The disclosure relates generally to the field of digital image processing, and in particular to a method for identifying groups of digital images that portray recurring themes in a consumer image collection.

BACKGROUND

With the ubiquitous presence of digital cameras and camera phones, people capture large numbers of digital still images and digital videos to mark both events that are important to them, as well as day-to-day occurrences that chronicle their lives. Large digital media collections including digital still images and digital videos accumulated over time contain a wealth of information that can be useful to understand users. Analyzing the content and timing of a user's digital media assets in a media collection that spans several years or more can yield a view into the user's interests. This knowledge can enable organization of the personal collection, sharing with contacts, as well as semi-automated storytelling. For example, if evidence from a user's personal photo collection suggests that he/she regularly takes pictures of flowers, the images in this group can be organized appropriately with links to other similar images, and fed as an input to a photo-book generator.

Typical browsing tools provide a temporal view of a media collection, with some that support browsing by tags or faces of recognized people (e.g., Picasa and iPhoto). In a system that supports tags, a user could find interesting groups by specifying a set of tags, but many patterns in a collection are based on a complex set of features, and a few high-level tags can generate only a limited variety of groups. In addition, the number of images in such groups can be too many or too few to be useful.

An automated system could potentially be used to create stories of a pre-defined format (e.g., pictures of one person over time, or images at the same GPS location), but it is not possible to create stories that are customized to a user's interests without attempting to understand the specific user's media collection. For example, in the case where a user primarily captures photographs at his home and is a gardening enthusiast who has a lot of pictures of his flowers, a system that creates a location-based story would detect a large single group at the same location and not be able to identify that the flower pictures in the collection form a distinct group.

There has been work in trying to understand images through object detection, tagging based on similar images on the web, and through the use of content-based features. People are the subject of a large fraction of consumer images, which can be tagged through the use of commercially available packages providing face detection and recognition capability. Captured media may also include GPS information identifying location of capture. So far, research on the use of these types of metadata has been focused on providing better ways of searching and organization.

There has been recent work in grouping images into events. U.S. Pat. No. 6,606,411 to Loui et al., entitled "A method for automatically classifying images into events," and U.S. Pat. No. 6,351,556, to Loui et al., entitled "A method for automatically comparing content of images for classification into events," disclose algorithms for clustering image content by temporal events and sub-events. Briefly described, the histogram of time differences between adjacent images or videos is clustered into two classes: time differences that correspond to event boundaries, and those that do not. A color block-based visual similarity algorithm is used to refine the event boundaries. Using this method, a reduction can be made in the amount of browsing required by the user to locate a particular event by viewing representative thumbnail images from the identified events along a timeline, instead of viewing all of the thumbnail images. However, related events with large temporal separation are spaced far apart on the timeline and are not easy to visualize as a group.

In the generally unrelated area of data mining, transactions histories for people (purchases, online activities, social network interactions etc) have been used to derive useful rules about individual and group behaviors. A transaction typically contains a transaction identifier and a set of items belonging to the transaction. This is also called "market basket" style data, from its roots in listing the contents of a supermarket shopping cart of individual shoppers. A transactions database contains a large set of transactions. Standard data mining techniques provide tools for extracting frequently occurring groups of items (itemsets) in transactions databases. There has been some work in using data mining techniques in the image collection domain.

U.S. Patent Application Publication 2011/0072047 to Wang et al. entitled "Interest learning from an image collection for advertising," focuses on suggesting user-targeted ads based on automatically detecting a user's interest from their images. The techniques described include computer-annotating images with learned tags, performing topic learning to obtain an interest model, and performing advertisement matching and ranking based on the interest model. However, this method uses topic ontology identification based on a large collection of human-identified categories. This can work for the advertisement selection problem addressed, since advertisement descriptors also have a limited vocabulary. But it is not possible to enumerate and detect all types of semantic relationships that may exist in users' collections because of the vast diversity of subject matter of photographs captured. Therefore, semantic themes need to customized to each particular user's collection based on analysis of the content of the collection.

Other work in related areas includes U.S. Pat. No. 6,598,054 to Schuetze et al., entitled "System and method for clustering data objects in a collection," which describes a system and method for browsing, retrieving, and recommending information from a collection using multi-modal features of the documents in the collection, as well as an analysis of users' prior browsing and retrieval behavior; and U.S. Patent Application Publication 2008/0275861 to Baluja et al., entitled "Inferring user interests," which describes a method that includes determining, for a portion of users of a social network, label values each comprising an inferred interest level of a user in a subject indicated by a label. Both of these methods are targeted at databases containing primarily textual and structured data.

Since a typical user has already accumulated many years' worth of digital images, finding images that fit a narrative thread by browsing through temporally distant media is difficult and time-consuming. There remains a need for a method to detect groups of images that are semantically related to each other but are temporally separated by long time differences.

SUMMARY

The present disclosure represents a method of identifying groups of related digital images in a digital image collection including a plurality of digital images, comprising:

analyzing each of the digital images in the digital image collection to generate associated feature descriptors related to image content or image capture conditions;

storing the feature descriptors associated with the digital images in a metadata database;

using a data processor to automatically analyze the metadata database to identify a plurality of frequent itemsets, wherein each of the frequent itemsets is a co-occurring feature descriptor group that occurs in at least a predefined fraction of the digital images, each frequent itemset being associated with a subset of the digital images;

determining a probability of occurrence for each the identified frequent itemsets based on one or more probability distributions determined from an analysis of a large number of image collections;

determining a quality score for each of the identified frequent itemsets responsive to the determined probability of occurrence;

ranking the frequent itemsets based at least on the determined quality scores;

identifying one or more groups of related digital images corresponding to one or more of the top ranked frequent itemsets; and storing an indication of the identified groups of related digital images in a processor-accessible memory.

This disclosure has the advantage that groups of related digital images sharing a common theme can be identified and used to generate narratives and products that are relevant to individual users.

It has the additional advantage that the image content of the digital images can be automatically analyzed and can be used together with the rich metadata associated with the digital images in order to determine the groups of related digital images.

It has the further advantage that groups of digital images that have a unifying theme across a wide temporal distance can be automatically identified, and used to provide a chronicle.

DETAILED DESCRIPTION OF THE PREFERRED EMBODIMENTS

The disclosure is inclusive of combinations of the embodiments described herein. References to "a particular embodiment" and the like refer to features that are present in at least one embodiment of the disclosure. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The present disclosure can be implemented in computer systems as will be well known to those skilled in the art. In the following description, some embodiments of the present disclosure will be described as software programs. Those skilled in the art will readily recognize that the equivalent of such a method can also be constructed as hardware or software within the scope of the disclosure.

Because image manipulation algorithms and systems are well known, the present description will be directed in particular to algorithms and systems forming part of, or cooperating more directly with, the method in accordance with the present disclosure. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
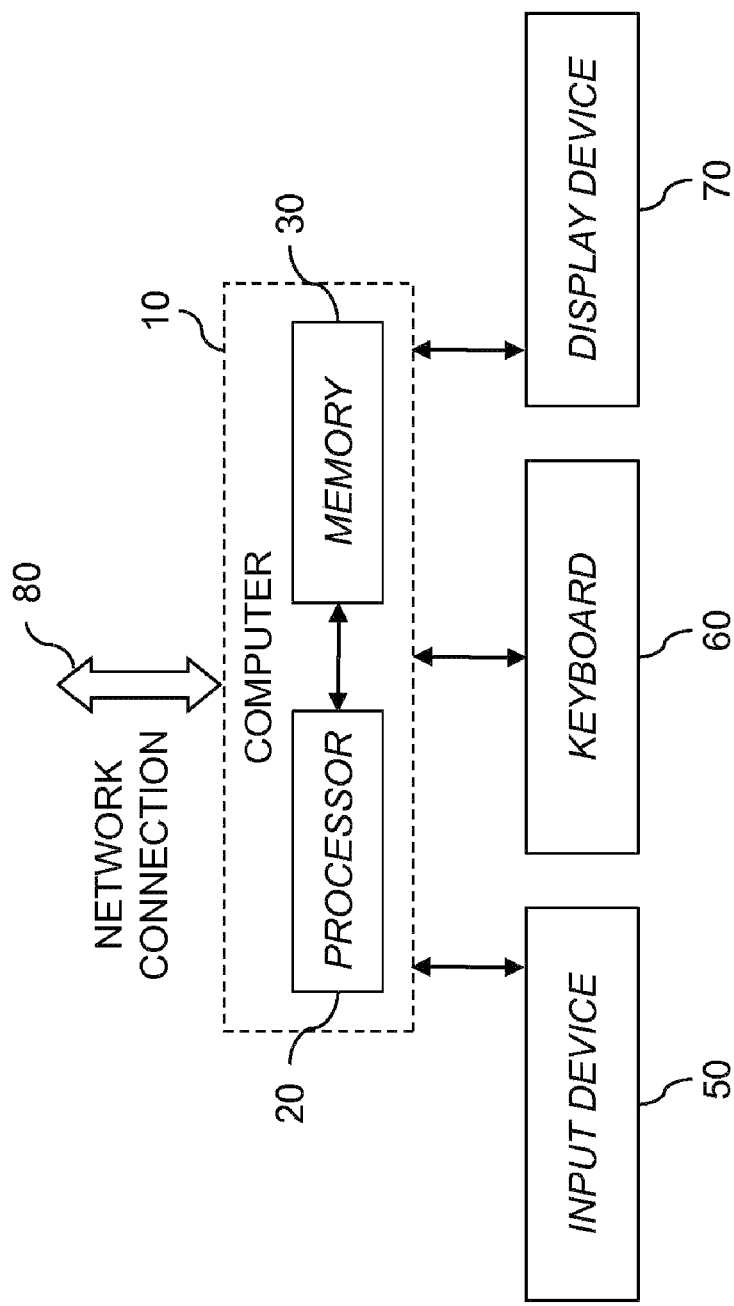
FIG. 1 is a high-level diagram showing the components of a system for practicing the present disclosure.

The present disclosure can be implemented in computer hardware and computerized equipment. For example, the method can be performed in a digital camera, a multimedia smart phone, a digital printer, on an internet server, on a kiosk, and on a personal computer. Referring to FIG. 1, there is illustrated a computer system for implementing the present disclosure. The present disclosure is not limited to the computer system shown, but can be used on any electronic processing system such as found in digital cameras, home computers, kiosks, or any other system for the processing of digital images. The computer system includes a computer 10. The computer 10 includes a processor unit 20 (e.g., a microprocessor) for receiving and processing software programs and for performing other processing functions. A memory unit 30 stores user-supplied and computer-generated data which can be accessed by the processor unit 20 when running a computer program.

A display device 70 (e.g., a monitor) is electrically connected to the computer 10 for displaying information and data associated with the software (e.g., by a graphical user interface). A keyboard 60 is also connected to the computer. As an alternative to using the keyboard 60 for input, a mouse can be used for moving a selector on a graphical user interface displayed on the display device 70 and for selecting an item on which the selector overlays, as is well known in the art. Input devices 50 such as compact disk (CD) readers and digital video disk (DVD) readers can be interfaced with the computer 10 for inputting the software programs and other information to the computer 10 and the processor unit 20. Still further, the computer 10 can be programmed, as is well known in the art, for storing the software program internally. In addition, media files (such as images, music and videos) can be transferred to the memory unit 30 of the computer 10 by use of the input devices 50 such as memory card readers, thumb drives, CDs and DVDs, or by connecting an image capture device (such as a digital camera, a cell phone or a digital video recorder) directly to the computer 10 such that it functions as an input device 50. The computer 10 can have a network connection 80 (such as a wired or wireless connection) to an external network, such as a local area network or the Internet. Software programs and media files can be transferred to the computer from other computers or the Internet through the network connection 80.

It should also be noted that the present disclosure can be implemented in a combination of software and hardware and is not limited to devices that are physically connected or located within the same physical location. One or more of the devices illustrated in FIG. 1 can be located remotely and can be connected via the network connection 80.

Figure 2:
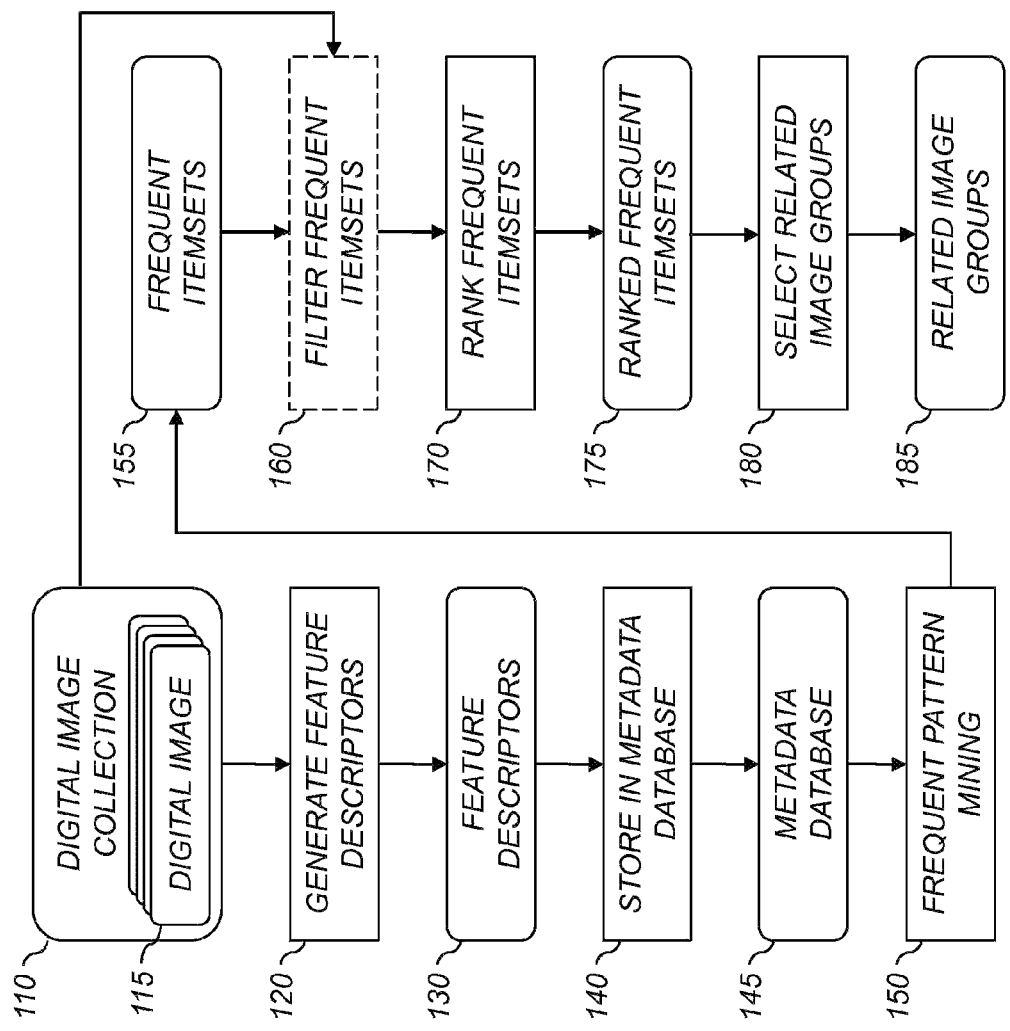
FIG. 2 is a flowchart showing the method of the present disclosure according to a preferred embodiment.

Referring to FIG. 2, a digital image collection 110 contains a collection of digital images 115 for a user. The digital images 115 can include any type of digital image file, such as a digital still image or a digital video. In a preferred embodiment, the digital image collection 110 resides in the memory unit 30 of the computer 10 (FIG. 1). The digital image collection 110 is processed by a generate feature descriptors step 120 to generate feature descriptors 130 associated with each digital image. The feature descriptors 130 are related to image content or image capture conditions for the digital images. Any type of feature descriptor 130 known in the art can be generated and used in accordance with the present disclosure.

Figure 3:
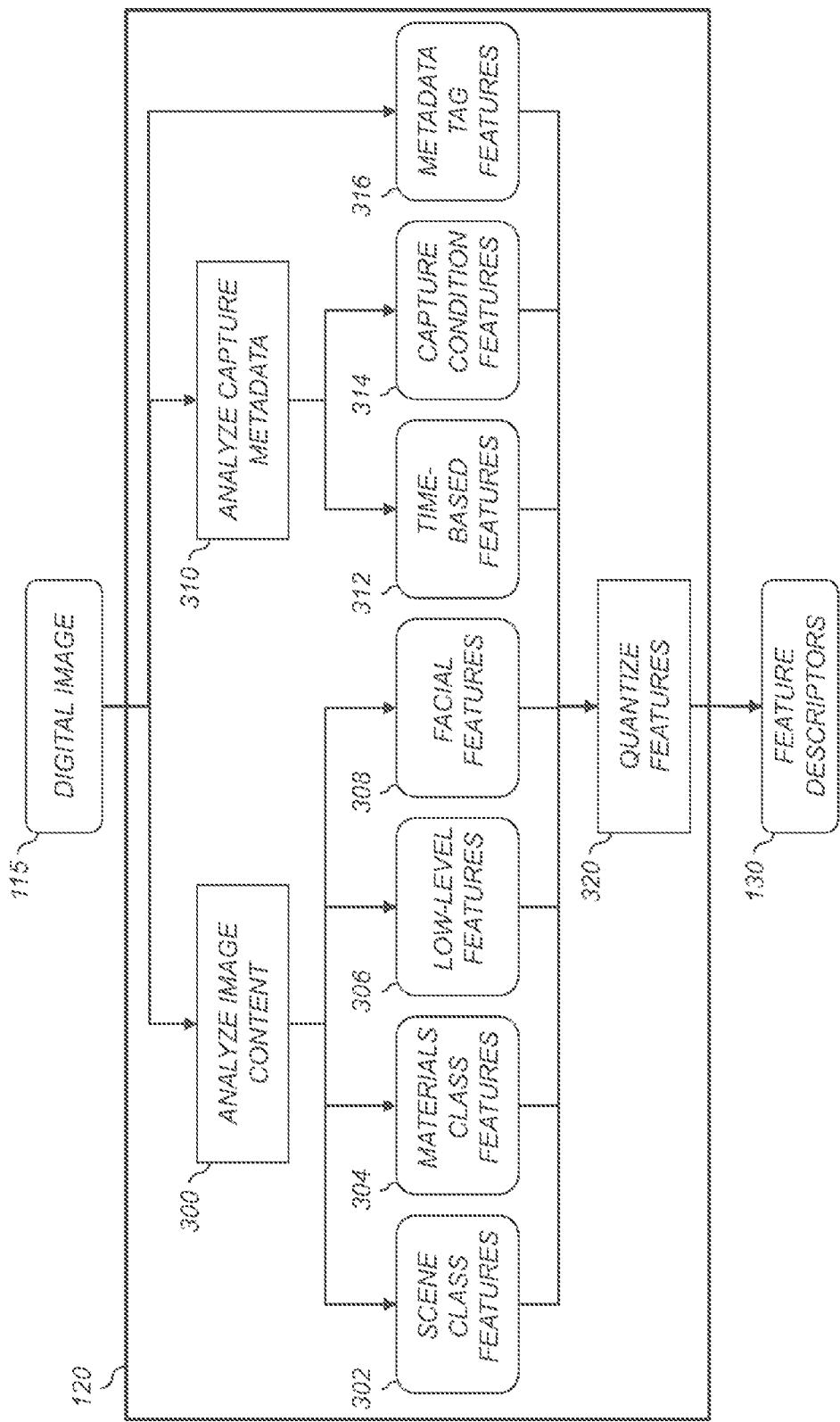
FIG. 3 is a flowchart showing additional details for an embodiment of the generate feature descriptors step of FIG. 2.

FIG. 3 shows additional details for the generate feature descriptors step 120 according to one embodiment, which illustrates the determination of a set of feature descriptors 130 for a particular digital image 115. An analyze image content step 300 is used to analyze the digital image 115 to characterize a series of features related to the image content, and an analyze capture metadata step 310 is used to characterize a series of features related to image capture conditions. In a preferred embodiment, the analyze image content step 300 determines scene class features 302, materials class features 304, low-level features 306 and facial features, and the analyze capture metadata step 310 determines time-based features 312 and capture condition features 314. These features can be determined using any method known in the art.

Scene class features 302 provide an indication of a scene type (e.g., urban scene, beach scene or nature scene) for the digital image 115. In one embodiment, the scene class features 302 are determined using the methods described in the article "Review of the state of the art in semantic scene classification" by Boutell et al. (Computer Science TR 799, University of Rochester, 2002). In some embodiments, capture metadata for the digital image 115 can be also used in the process of determining the scene class features 302. For example, commonly-assigned U.S. Patent Application Publication 2005/0105776 to Luo, entitled "Method for semantic scene classification using camera metadata and content-based cues" teaches a method for classifying a scene as indoor or outdoor using camera metadata and image content.

Materials class features 304 provide an indication of various materials (e.g., water, grass or snow) included in the digital image 115. In one embodiment, the materials class features 304 are determined using a supervised learning approach such as that described by Carneiro et al. in the article "Supervised learning of semantic classes for image annotation and retrieval" (IEEE Transactions on Pattern Analysis and Machine Intelligence, Vol. 29, pp. 394-410, 2007). Another method for determining materials class features 304 that can be used in accordance with the present disclosure is described by Boutell et al. in the article "Learning multi-label scene classification" (Pattern Recognition, Vol. 37, pp. 1757-1771, 2004). This method is designed to determine materials class features for digital images 115 that can contain multiple materials classes. The method for detecting sky in an image described in commonly-assigned U.S. Pat. No. 6,504,951 to Luo et al., entitled "Method for detecting sky in images" can also be used to determine materials class features 304 in some embodiments.

Low-level features 306 provide an indication of the visual content of an image in terms of the colors and textures present in the digital image 115. These low-level features are useful for determining the similarity of appearance between two images. To ensure that the detected colors match the perceived color regions in the digital image 115, spatially coherent color regions in the digital image 115 are identified. Commonly-assigned U.S. Pat. No. 6,480,840 to Zhu et al., entitled "Method and computer program product for subjective image content similarity-based retrieval," describes determining color features from an image based on the assumption that significantly-sized, coherently-colored regions of an image are perceptually significant. Accordingly, a coherent color histogram is first computed for an image that provides an indication of the number of pixels of a particular color that belong to coherently colored regions. Dominant colors are then determined that occupy a significant proportion (according to a predefined threshold) of the overall pixels. U.S. Pat. No. 6,480,840 also describes the determination of texture features that can be used for low-level features 306 in accordance with the present disclosure.

Facial features 308 provide an indication of any human faces that are detected in the digital image 115. Methods for detecting human faces are well known in the art of digital image processing. For example, a face detection method that can be used in accordance with the present disclosure is described by Jones et al. in the article "Fast Multi-view Face Detection" (Mitsubishi Electric Research Laboratories, TR2003-96, 2003). This work was presented at the IEEE Conference on Computer Vision and Pattern Recognition in 2003. The facial features 308 computed from the face detection output include the number of faces in the image, and the approximate sizes and locations of faces in the digital image 115. In some embodiments, the facial images can be analyzed to determine additional information about the image that can be used as facial features 308 (e.g., estimated age and gender of the persons in the image). For example, a method for assigning a face to an age category is described in U.S. Pat. No. 5,781,650 to Lobo, entitled "Automatic Feature Detection and Age Classification." The method uses ratios of facial measurements that are known to change with age due to bone structure development. Also, commonly assigned U.S. Pat. No. 7,362,919 to Das, entitled "Method for generating customized photo album pages and prints based on people and gender profiles" describes a method for determining the gender of a detected face using facial measurements and facial textures that are known to be different between the genders.

Most digital images 115 include various metadata tags relating to the image capture conditions. Such metadata tags are typically stored in the file header of the digital image (e.g., in an EXIF file header). The analyze capture metadata step 310 analyzes the capture metadata to characterize additional image features. The metadata tags generally include a capture date/time metadata tag providing an indication of the date and time that the digital image 115 was captured. Time-based features 312 are determined directly or indirectly from the capture date/time metadata. Some examples of time-based features 312 that can be determined include a time of day feature, a day feature, a month feature, a year feature, a season feature and a day-of-week feature.

Capture condition features 314 relate to various camera settings and scene attributes. Some examples of capture condition features 314 that can be used in accordance with the present disclosure include scene lighting features (backlight present or not), scene brightness level features (dark or light), scene contrast features (high contrast or low contrast) and focal distance (distant or close-up scene). In addition, if the digital camera, or an associated accessory, includes a Global Positioning System (GPS) sensor, the capture metadata generally includes the geographical coordinates of the capture location. In some cases, camera metadata can be combined with auxiliary knowledge databases to determine other features for the image. For example, the geographical coordinates can be used to determine a geographical feature name (e.g., a park name, a body of water name, a town name or a building name) by using an auxiliary database such as the U.S. Geological Survey's Board of Geographic Names Geographic Names Information System (GNIS).

In some embodiments, the metadata tags in the digital image 115 can be used to directly provide additional metadata tag features 316. In some cases, the metadata tags may have been determined automatically. For example, some digital images 115 may have been processed using available facial recognition technology (such as the OKAO Vision" Face Sensing Technology from Omron) to determine tags indicating the names of the person(s) in the image. In other cases, the metadata tags may have been manually provided by the user. For example, the user may have added tags indicating the capture location, the names of persons in the image or other keywords.

In a preferred embodiment, each feature is expressed in terms of a finite number of symbolic descriptors so that the set of all possible symbolic feature descriptions is finite. A quantize features step 320 is used to quantize the various features into a finite number of predefined states. For example, scene class features 302 can be expressed as a binary output having only two levels for a predefined set of scene types (e.g., either the scene type is present or absent). Scene classification algorithms typically generate a confidence score that is used to indicate the degree of confidence of the detection. A threshold is used to generate the binary output. If the confidence score is higher than the threshold, the scene type is set to be "true," and the scene type is included as a feature descriptor, otherwise it is not included. For example, if a beach scene is detected by the scene classification algorithm with a confidence score higher than the threshold, the feature descriptor "Beach" is associated with the digital image 115.

In the case of materials class features 304, the number of pixels in the digital image that were determined to have a particular material type can be compared to a predefined threshold. If the image has more pixels of a given material type than the threshold, that material type is added as a feature descriptor associated with the digital image 115.

For the low-level features 306, color feature descriptors are determined indicating that the digital image 115 contains a particular color. In a preferred embodiment, to achieve a small, fixed number of color choices to add as feature descriptors, the determined dominant are translated from the native RGB color space of the image into color names derived from the ISCC-NBS color naming system with the color names collapsed to the main color categories (i.e., red, blue, yellow, green, pink, purple, brown, orange, olive, white, black and gray) as described in the article "Indexing flower patent images using domain knowledge" by Das et al (IEEE Intelligent Systems and their Applications, Vol. 14, pp. 24-33, 1999). This limits the number of choices to twelve named colors.

For the facial features 308, a four-level feature descriptor for the number of people (no faces, one person, group of two, or three or more faces) in an image and a three-level feature descriptor that describes the size of faces in an image (small, medium, or large) are computed.

The time-based features 312 are quantized as follows: time of day (morning, afternoon, evening or night), time of year (spring, summer, autumn or winter) and time of week (weekday or weekend). For the time of year feature, the year is divided into the main seasons and the feature descriptor is determined based on the month of capture of the image based on the climate at the geographical location of the user.

In a preferred embodiment, the capture conditions features 314 and the metadata tag features 316 are translated directly to symbolic feature descriptors. For example, "backlight" when backlight is present, "high contrast" when the image contrast is determined to be high; the names of persons present (determined using face recognition or from user-provided metadata tags) and the names of any geographic features (determined automatically from the GPS coordinates or from user-provided metadata tags).

Table 1 shows a list of example feature descriptors that can be determined from available algorithms for each of the feature categories:

TABLE 1

Example feature descriptors

| Feature Category | Example Feature Descriptors |
| --- | --- |
| Scene Class Features | NatureScene, CityBuildings, Beach, Indoor, Sunset |
| Materials Class Features | Sky, Snow, Water, FallFoliage, GreenFoliage, Text |
| Low-Level Features | Blue, Green, Red, Yellow, Pink, Purple, White |
| Facial Features | NoFace, OnePerson, GroupOf2, 3OrMoreFaces, SmallFace, LargeFace, Baby, Adult, Female, Male |
| Time-Based Features | TimeOfDay, TimeOfYear, TimeOfWeek |
| Capture Condition Features | Closeup, Backlight, Dark |
| Metadata Tag Features | People Names, Geographic Location |

Returning to a discussion of FIG. 2, a store in database step 140 is used to store the feature descriptors 130 in a metadata database 145 associated with the digital image collection 110. In a preferred embodiment, the metadata database 145 is stored using the well-known transactional database format described by Han et al. in the book "Data Mining Concepts and Techniques" (Morgan Kaufmann Publishers, Boston, pp. 14-15, 2006). To apply this approach, a "transaction" with a unique transaction identifier (ImageID) is defined for each digital image 115 in the digital image collection 110. In one embodiment, the filename for the digital image 115 is used for the unique transaction identifier. The quantized feature descriptors 130 for the digital image 115 are used to define a set of "items" for the corresponding transaction. Each transaction is of the form: (ImageID, Feature_Descriptor1, Feature_Descriptor2, . . . Feature_DescriptorN) where the number of feature descriptors N may be different for different digital images 115 in the digital image collection 110.

Next, a frequent pattern mining step 150 is used to identify recurring patterns that are present in the metadata database 145. In a preferred embodiment, the frequent pattern mining step 150 identifies a set of frequent itemsets 155, where each of the frequent itemsets 155 is a co-occurring feature descriptor group that occurs in at least a predefined fraction of the digital images 115.

The frequent pattern mining step 150 can use any method for identifying frequent itemsets 155 known in the art. In a preferred embodiment, the frequent itemsets 155 are determined using the following method. Let $\Gamma$ be the set of all possible symbolic feature descriptions in the metadata database 145. Any subset $F\subseteq \mathbf{F}$ is referred to as an "itemset." Let each image "i" in the collection correspond to a transaction i containing an itemset of variable length including the feature descriptors associated with the digital image 115 in the metadata database 145. Then $\tau=<_1, \ldots, i, \ldots, n>$ is the transactional database consisting of a sequence of itemsets corresponding to each digital image 115 in the digital image collection 110.

Figure 6:
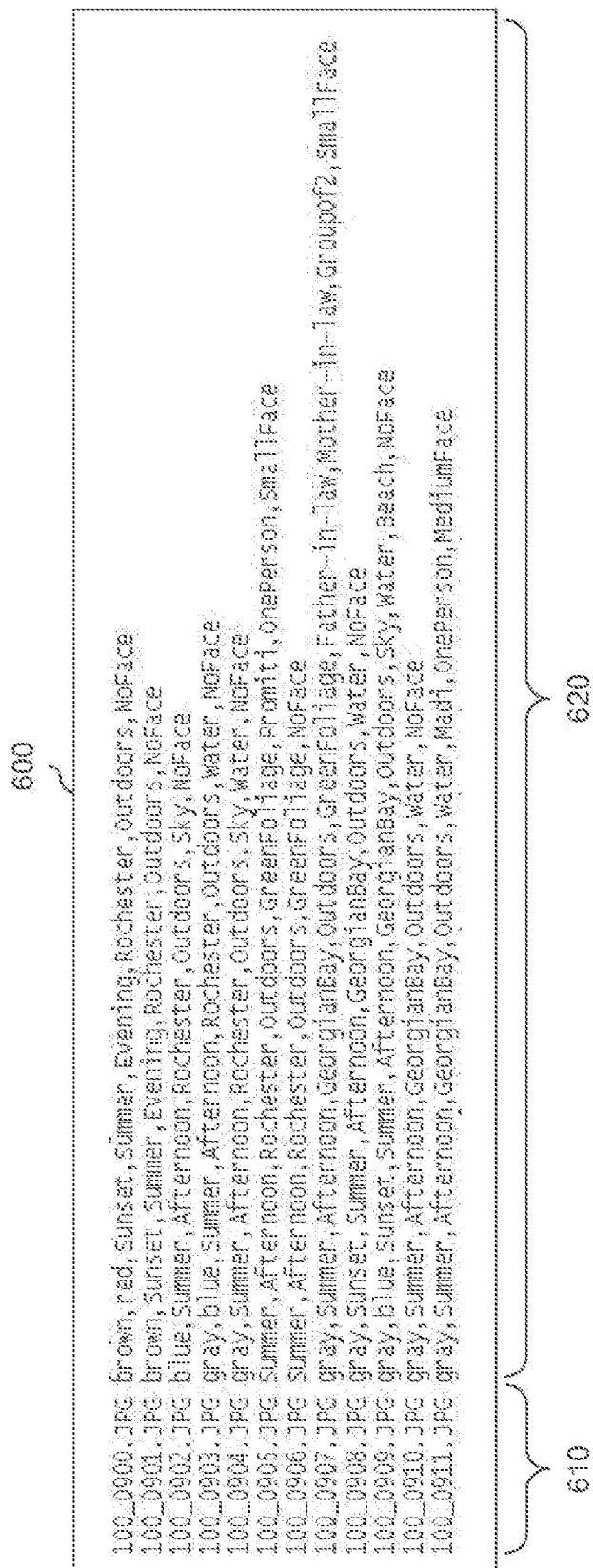
FIG. 6 shows an example of a transactional database that can be used in accordance with the present disclosure.

FIG. 6 shows a section of a transactional database 600 determined for an example digital image collection 110 (FIG. 2). Each row of the transactional database 600 shows the transaction corresponding to a particular digital image 115 (FIG. 2). The first column of each row is the transaction ID 610, which in this case is the unique image filename. This is followed by the feature descriptors 620 corresponding to the particular digital image 115.

For any itemset, F, the "cover of F" is defined as:

$$\operatorname{cover}(F)=\{\tau\epsilon\tau|F\subseteq\tau\}$$

That is, the cover of F consists of the set of transactions in the transactional database containing the items in the itemset F, and therefore are to be counted towards the frequency of F. The "support of F" is defined to be the size of the cover of F (i.e., the number of transactions in the cover):

$$\operatorname{support}(F)=|\operatorname{cover}(F)| \quad (2)$$

where the operator |A| returns the number of elements in the set A.

Frequent itemsets $\Phi$ are defined for a given minimum support "minsup" as:

$$\Phi=\{F|\operatorname{support}(F)\geq\operatorname{minsup}\}$$

That is, the set of itemsets having a support that is greater than or equal the specified minimum support. The minimum support is specified to be in the interval [0,1] as a fraction of the total number of transactions in the database. A frequent itemset is maximal if there are no proper supersets of F in Γ that are also frequent.

Algorithms for frequent itemset mining in a transactional database are well-known in the literature. In some embodiments, an implementation of the Eclat algorithm described by Borgelt in the article "Efficient Implementations of Apriori and Eclat" (Proc. of IEEE ICDM Workshop on Frequent Itemset Mining Implementations, 2003) is used to mine frequent itemsets. In a preferred embodiment, maximal frequent itemsets are generated using a value of minsup=0.05, and only frequent itemsets with 3 or more items are considered for further processing.

Due to inaccuracies in the automatically generated metadata, the database entries are likely to include both false positives and false negatives. These errors will generally not have a significant effect on the frequent itemsets 155 that are detected since random errors are not likely to form consistent frequent groups. However, a filtering step can be included to check for and eliminate spurious frequent itemsets. Referring to FIG. 2, the frequent itemsets 155 generated are filtered as an optional filter frequent itemsets step 160 to remove some of the spurious frequent itemsets. (The step is shown using a dashed outline to reflect the fact that it is optional.)

Figure 4:
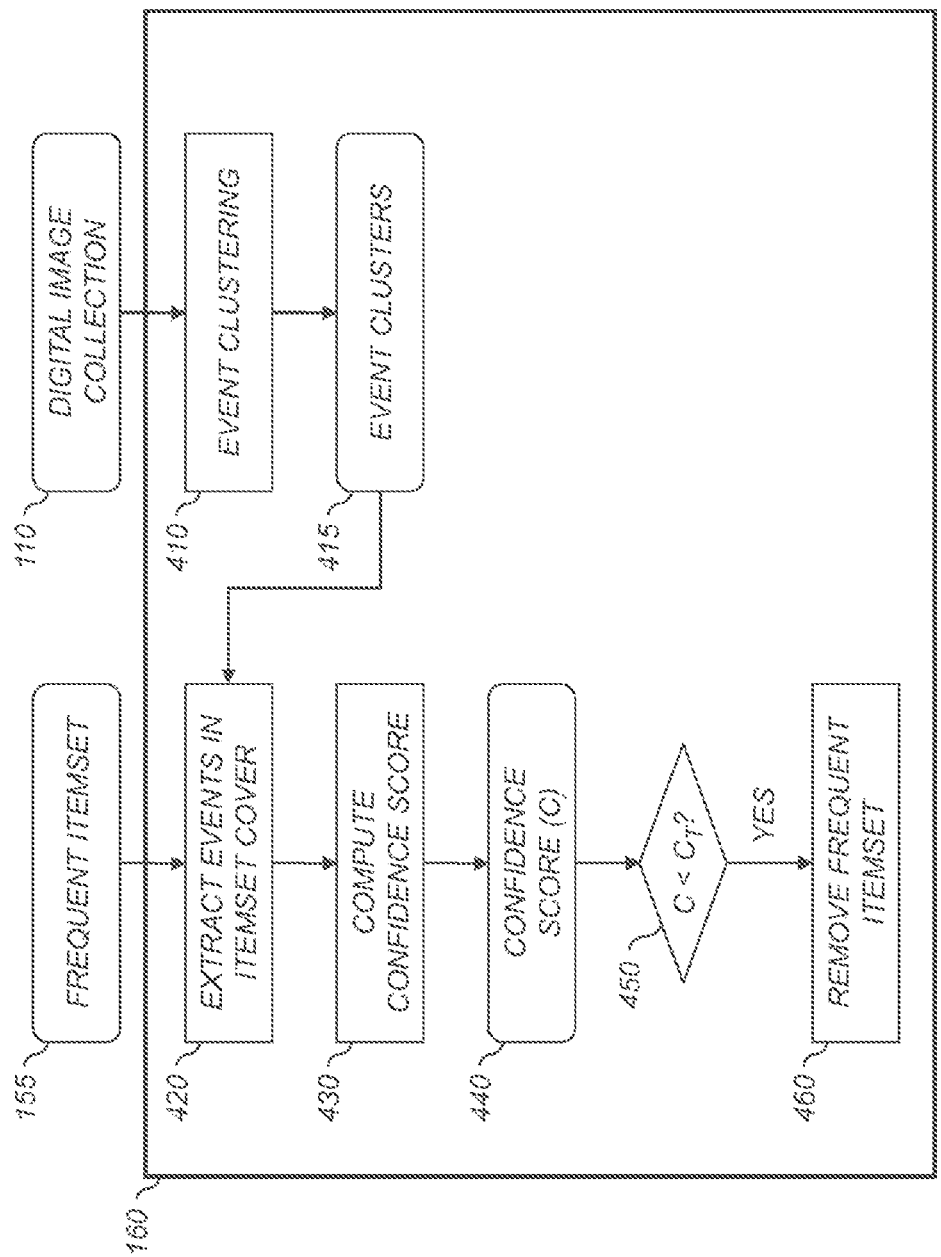
FIG. 4 is a flowchart showing additional details for an embodiment of the optional filter frequent itemsets step of FIG. 2.

FIG. 4 shows additional details for the filter frequent itemsets step 160 according to one embodiment. This approach makes use of the fact that in the consumer imaging domain, temporal closeness of captured images indicates that they are more likely to be related to each other. In particular, if the images fall within the same event, they are likely to be similar in appearance as well as share other common features.

The digital image collection 110 is passed to an event clustering step 420 to generate a set of event clusters 415 corresponding to events in the digital image collection 110. In a preferred embodiment, the event clustering step 410 uses the method described in the aforementioned U.S. Pat. No. 6,606,411, to Loui et al., entitled "A method for automatically classifying images into events." Briefly summarized, according to this method a collection of images is classified into one or more events by determining one or more largest time differences of the collection of images based on time/date clustering of the images and separating the plurality of images into the events based on having one or more boundaries between events where one or more boundaries correspond to the one or more largest time differences.

For each of the identified frequent itemsets 155, an extract events in itemset cover step 420 is used to retrieve the supporting transactions (each transaction corresponding to a unique digital image). The events corresponding to these digital images are extracted by comparing with them with the event clusters 415.

A compute confidence score step 430 is used to determine a corresponding confidence score 440 (C) for the frequent itemset 155 providing an indication of whether there is supporting evidence from related digital images from the same event. Considering the supporting transactions (digital images) for a given frequent itemset 155, if there are multiple images from the same event, the itemset is assigned a higher confidence value. In one embodiment, the confidence score 440 is computed as:

$$\operatorname{confidence}(F)=\operatorname{support}(F)/\Sigma_{j=1}^{m}\operatorname{NumImages}(\operatorname{Event}_j) \quad (4)$$

where $\operatorname{Event}_1, \operatorname{Event}_2, \ldots, \operatorname{Event}_m$ are the events in which the digital images in the cover of F are included, and the function $\operatorname{NumImages}(\operatorname{Event}_j)$ provides the number of images in the specified event. Therefore, the confidence score 440 is given by the number of images that are included in the transactions supporting an itemset F expressed as a fraction of the total number of images in the events to which they belong.

A confidence score test 450 is used to decide whether the frequent itemset 155 should be retained or removed by comparing the confidence score 440 to a predefined threshold $C_T$. The predefined threshold $C_T$ is determined experimentally so that spurious frequent itemsets will generally be removed. If the confidence score 440 is less than the predefined threshold $C_T$, a remove frequent itemset step 460 is used to remove the frequent itemset 155, otherwise it is retained.

The number of frequent itemsets remaining, even after applying the filter frequent itemsets step 160, is usually quite large; for digital image collections 110 with a few thousand images, this number could be on the order of 50-100 frequent itemsets or more. Returning to a discussion of FIG. 2, a rank frequent itemsets step 170 is next applied to assess the frequent itemsets 155 and determine ranked frequent itemsets 175 such that frequent itemsets 155 that are more likely to be interesting to the user are ranked higher. Any method for ranking the frequent itemsets 155 known in the art can be used in accordance with the present disclosure. One such ranking method involves computing a numerical value that captures the degree to which an itemset is unusual and unique to a collection. This approach makes the assumption that generic itemsets that are common to most collections are less interesting.

Figure 5:
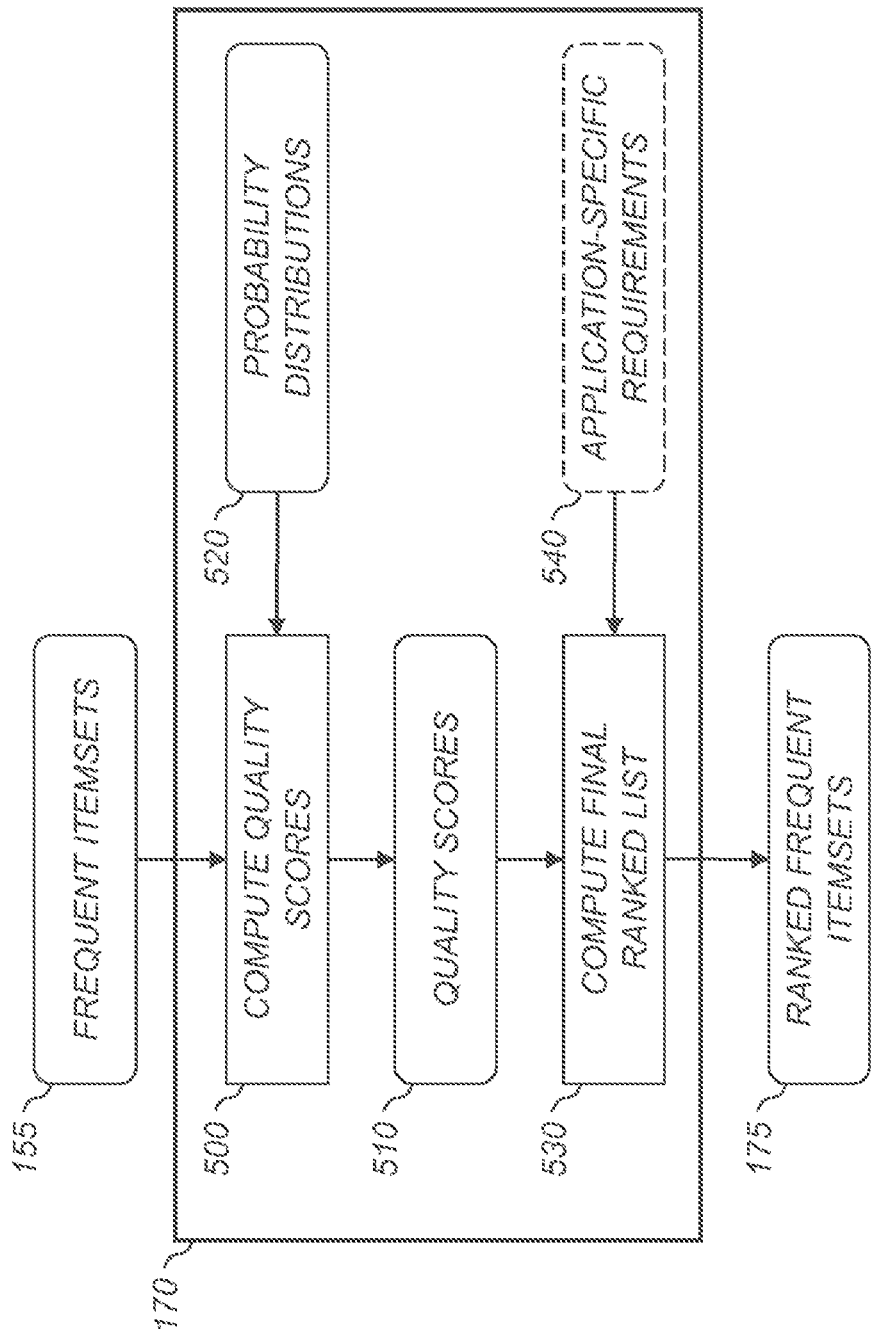
FIG. 5 is a flowchart showing additional details for an embodiment of the rank frequent itemsets step of FIG. 2.

FIG. 5 shows additional details for the rank frequent itemsets step 170 according to a preferred embodiment. A compute quality scores step 500 is used to compute quality scores 510 for each of the frequent itemsets 155. A set of probability distributions 520 is determined representing the probability of occurrence of the various feature descriptors in a general population of consumer images. The probability distributions 520 can be determined by analyzing a large collection of digital images from a large number of individuals. The probabilities are preferably represented as a fraction by dividing the number of digital images having the feature descriptor by the total number of digital images in the collections. Personal collections available on the web through photo-sharing sites such as Flickr could be used for the purpose. In a preferred embodiment, the quality score 510 for a particular frequent itemset 155 (F) is determined by computing the inverse of the product of the probability of occurrences of the relevant feature descriptors using the following equation:

$$\text{quality}(F) = 1/\Pi_{i=1}^{n} p(f_i) \tag{5}$$

where the frequent itemset 510 (F) contains feature descriptors $f_1, f_2, \ldots, f_n$, and $p(f_i)$ is the probability of occurrence of $f_i$. Those skilled in the art will recognize that the product of the probability of occurrences of the relevant feature descriptors represents an estimate of a probability of occurrence for the frequent itemset under the assumption that the feature descriptors are independent. In other embodiments, joint probability distributions can be used to account for any correlations that may exist between the feature descriptors.

For example, consider the itemsets "Outdoor, Sky, Summer" and "Outdoor, Baby, Summer" where the probability of occurrences of "Outdoor" is 0.5, "Summer" is 0.25, "Sky" is 0.3 and "Baby" is 0.05. Then the quality score if the first itemset is 27 while the quality score of the second itemset is 160. This indicates that the itemset with "Baby" in it is more interesting and therefore, ranked higher than the similar itemset with "Sky" instead of "Baby". Specific people names and locations are also more likely to be unique to a collection and have low probability of occurrence in the general population, resulting in higher quality scores 510.

Finally, a compute final ranked list step 530 is used to rank the frequent itemsets 155 according to the computed quality scores 510. In some embodiments, optional application-specific requirements 540 can be enforced during the formation of the ranked frequent itemsets 175. For example, if the application is to generate a story or narrative from a user's collection that can be used in a photo-book or slideshow, it can be noted that narratives or chronicles are more interesting when the themes cover a large time span. To detect themes that span longer time periods, and are therefore more suitable as a narrative, the longest time difference between images in the cover of a frequent itemset are computed to determine an associated time span. The top N frequent itemsets from the ranked list is selected, where N is based on the approximate number of images to be included the photo-book or slideshow, and this subset of frequent itemsets is re-ranked by decreasing order of time span. Another example of re-ranking based on application-specific requirements 540 is to impose a requirement that preferentially selects images having people in them (e.g., for a family album). Here the re-ranking can be based on the number of people in the images. However, the use of application-specific requirements 540 is optional; in the absence of any application-specific requirements 540, a pre-defined number of frequent itemsets having the highest quality scores 510 can be provided for the final list of ranked frequent itemsets.

Returning to a discussion of FIG. 2, a select related image groups step 180 is used to select related image groups 185 responsive to the ranked frequent itemsets 175. This step extracts groups of digital images 115 from the digital image collection 110, with each group corresponding to the digital images 115 in the cover of each of the frequent itemsets in the final list of ranked frequented itemsets 175. Each related image group 185 will generally correspond to a particular theme that includes image content corresponding to the associated feature descriptors. An indication of the related image groups 185 can be stored in a processor-accessible memory for use in various applications.

It has been found that a user's primary picture-taking interests (e.g., baby, garden, school sports, etc.), will generally appear as a related image group 185 based on some combination of underlying metadata. Because the detected groups are strictly data-driven (with no a priori assumptions about a user's collection), they are customized to the type of image content in a specific user's digital image collection 110. Each detected related image group 185 will generally represent a theme in the collection. The formation of the related image group 185 require no work by the user.

In some embodiments, the related image groups 185 are presented to the user for review and selection. The user can then select one of the presented related image groups 185 for use in their intended application. For example, the related image groups 185 can be displayed to the user in the form of a slideshow or a photo-book or some other product that the user may desire to purchase. In other application, the related image groups 185 can be automatically used for a particular application without any user review.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present disclosure.

The disclosure has been described in detail with particular reference to certain preferred embodiments thereof, but it will be understood that variations and modifications can be effected within the spirit and scope of the disclosure.

PARTS LIST

- 10 computer
- 20 processor unit
- 30 memory unit
- 50 input device
- 60 keyboard
- 70 display device
- 80 network connection
- 110 digital image collection
- 115 digital image
- 120 generate feature descriptors step
- 130 feature descriptors
- 140 store in metadata database step
- 145 metadata database
- 150 frequent pattern mining step
- 155 frequent itemsets
- 160 filter frequent itemsets step
- 170 rank frequent itemsets step
- 175 ranked frequent itemsets
- 180 select related image groups
- 185 related image groups
- 300 analyze image content step
- 302 scene class features
- 304 materials class features
- 306 low-level features 308 facial features
310 analyze capture metadata step
312 time-based features
314 capture condition features
316 metadata tag features
320 quantize features step
410 event clustering step
415 event clusters
420 extract events in itemset cover step
430 compute confidence score step
440 confidence score
450 confidence score test
460 remove frequent itemset step
500 compute quality scores step
510 quality scores
520 probability distributions
530 compute final ranked list step
540 application-specific requirements
600 transactional database
610 transaction ID
620 feature descriptors

What is claimed is:

1. A method comprising:
storing, in a computing device, feature descriptors for each image in a first plurality of images, wherein the feature descriptors are related to image content or image capture conditions;
identifying, by the computing device, a plurality of itemsets, wherein each itemset of the plurality of itemsets comprises a set of co-occurring feature descriptors that occurs in a respective subset of images in the first plurality of images;
associating, by the computing device, each itemset with the respective subset of images in which the itemset occurs;
determining, by the computing device, a quality score for each itemset, wherein the quality score is related to a probability that the itemset occurs in a general population of images based on a probability distribution determined from an analysis of a second plurality of images;
identifying, by the computing device, a first itemset based on the determined quality score; and
storing, by the computing device, an indication of a respective subset of images associated with the identified first itemset.

2. The method of claim 1, further comprising:
performing an event clustering operation to cluster the first plurality of images into a set of events;
determining a confidence score for each identified itemset based at least upon the events associated with the subset of images corresponding to the identified itemset;
removing, from the plurality of itemsets, itemsets having an associated confidence score lower than a pre-defined threshold.

3. The method of claim 2, wherein the confidence score for an itemset is based on a comparison of the number of images from a given event that are associated with the itemset to the total number of images from the event.

4. The method of claim 1, wherein the feature descriptors are stored using a transactional database format.

5. The method of claim 1, further comprising determining the feature descriptors for the images in the first plurality of images by analyzing image content of the images.

6. The method of claim 5, wherein the feature descriptors are determined by analyzing image content of the images, and wherein the image content comprises scene class features, materials class features, low-level features, or facial features.

7. The method of claim 1, further comprising determining the feature descriptors for the images in the first plurality of images by analyzing capture metadata associated with the images.

8. The method of claim 7, wherein the feature descriptors are determined by analyzing capture metadata that indicates capture condition features.

9. The method of claim 1, wherein the feature descriptors include feature descriptors corresponding to metadata tags associated with the images.

10. The method of claim 9, further comprising determining the metadata tags by automatically analyzing image content or capture metadata associated with the first plurality of images.

11. The method of claim 1, wherein the quality score of each respective itemset is inversely related to the probability that the itemset occurs in a general population of images.

12. The method of claim 1, wherein the feature descriptors are quantized into a finite number of predefined states.

13. The method of claim 1, wherein identifying the first itemset is also based upon a time difference between an earliest capture time and a latest capture time associated with the subset of images corresponding to the first itemset.

14. The method of claim 1, wherein identifying the first itemset is also based upon the number of people in the subset of images corresponding to the first itemset.

15. The method of claim 1, further comprising causing display of the subset of images associated with the first itemset in the form of a slideshow or photo-book.

16. The method of claim 1, wherein the identified first itemset is identified based on the first itemset having a lower probability that the itemset occurs in a general population of images than other identified itemsets.

17. A computing system comprising:
a memory configured to store feature descriptors for each image in a first plurality of images, wherein the feature descriptors are related to image content or image capture conditions; and
a processing system configured to:
identify a plurality of itemsets, wherein each itemset of the plurality of itemsets comprises a set of co-occurring feature descriptors that occurs in a respective subset of images in the first plurality of images;
associate each itemset with the respective subset of images in which the itemset Occurs;
determine a quality score for each respective itemset, wherein the quality score is related to a probability that the itemset occurs in a general population of images based on a probability distribution determined from an analysis of a second plurality of images;
identify a first itemset based on the determined quality score; and
store, in the memory, an indication of a respective subset of images associated with the identified first itemset.

18. The system of claim 17, wherein the processing system is further configured to:
perform an event clustering operation to cluster the first plurality of images into a set of events;
determine a confidence score for each identified itemset based at least in part on the number of images from the same events in the digital images corresponding to the frequent itemset;
remove itemsets having an associated confidence score lower than a pre-defined threshold from the first plurality of itemsets.

19. The system of claim 17, wherein the processing system is further configured to determine the feature descriptors by analyzing image content of each of the first plurality of images, wherein the image content comprises scene class features, materials class features, low-level features, and facial features.

20. A non-transitory computer readable medium having stored thereon instructions executable by a computing device to cause the computing device to perform functions, the functions comprising:

storing feature descriptors for each image in a first plurality of images, wherein the feature descriptors are related to image content or image capture conditions;

identifying a plurality of itemsets, wherein each of the identified itemsets is a set of co-occurring feature descriptors that occurs in a respective subset of images in the first plurality of images;

associating each itemset with the respective subset of images in which the itemset occurs;

determining a quality score for each respective itemset, wherein the quality score is related to a probability that the itemset occurs in a general population of images based on a probability distribution determined from an analysis of a second plurality of images;

identifying a first itemset based on the determined quality score; and storing an indication of a respective subset of images associated with the identified first itemset.

\* \* \* \* \*